C. H. NORTON.
CLUTCH MECHANISM.
APPLICATION FILED MAR. 23, 1918.

1,361,797.

Patented Dec. 7, 1920.

INVENTOR
C. H. NORTON
BY
Clayton L. Jenks
ATTORNEY

Witnesses
L. F. Butterfield
R. D. Hubbell

UNITED STATES PATENT OFFICE.

CHARLES H. NORTON, OF WORCESTER, MASSACHUSETTS, ASSIGNOR TO NORTON COMPANY, OF WORCESTER, MASSACHUSETTS, A CORPORATION OF MASSACHUSETTS.

CLUTCH MECHANISM.

1,361,797.   Specification of Letters Patent.   Patented Dec. 7, 1920.

Continuation of application Serial No. 127,397, filed October 24, 1916. This application filed March 23, 1918. Serial No. 224,330.

*To all whom it may concern:*

Be it known that I, CHARLES H. NORTON, a citizen of the United States of America, residing at Worcester, in the county of Worcester and State of Massachusetts, have invented certain new and useful Improvements in Clutch Mechanisms, of which the following is a full, clear, and exact specification.

My invention relates to a driving and reversing mechanism and more particularly to means for reducing the shock commonly occurring at the moment of reversal of such mechanism.

In heavy machinery having periodically movable or reversible parts, such as the table of a grinding machine, a considerable shock is obtained when any change of movement is made, as by means of a clutch mechanism, unless special provisions are provided to overcome such an objectionable feature. A large portion of this shock is due to the movable table, the driving shaft and the operating gearing being large and massive and having considerable momentum when normally moved; hence when the power is shut off and the mechanism is reversed, considerable energy is involved in overcoming the inertia of these movable parts. Furthermore, since reversing mechanism of the type covered by my invention involves a clutch member slidable between oppositely rotating driving members, and since the clutch member is commonly spring actuated and moves at high speed from one end to the other of its path of travel, it causes considerable shock when it is stopped abruptly.

It is accordingly an object of my invention to provide a lost motion connection in a clutch mechanism which permits massive, movable machine parts to come gradually to rest under their own frictional retarding forces, after the clutch has been thrown for a reverse movement, and the driving force has been temporarily disconnected from the driven parts. A further object is to cushion the movement of the sliding member of a clutch in a driving and reversing mechanism by entrapping oil between this member and an adjacent portion of the mechanism and then permitting the same to escape gradually under the pressure of the moving clutch member, and to combine the oil cushioning means and the lost motion connection in a compact, unitary clutch structure which will reduce the noise and shock strains normally incident to reversal of direction of movement of a load and thereby improve the operation of the whole machine.

With these and other objects in view, as will appear from the following disclosure, my invention resides in the combination of parts set forth in the specification and covered by the claims appended hereto.

In the drawings in which like numerals indicate like parts:

Figure 1:
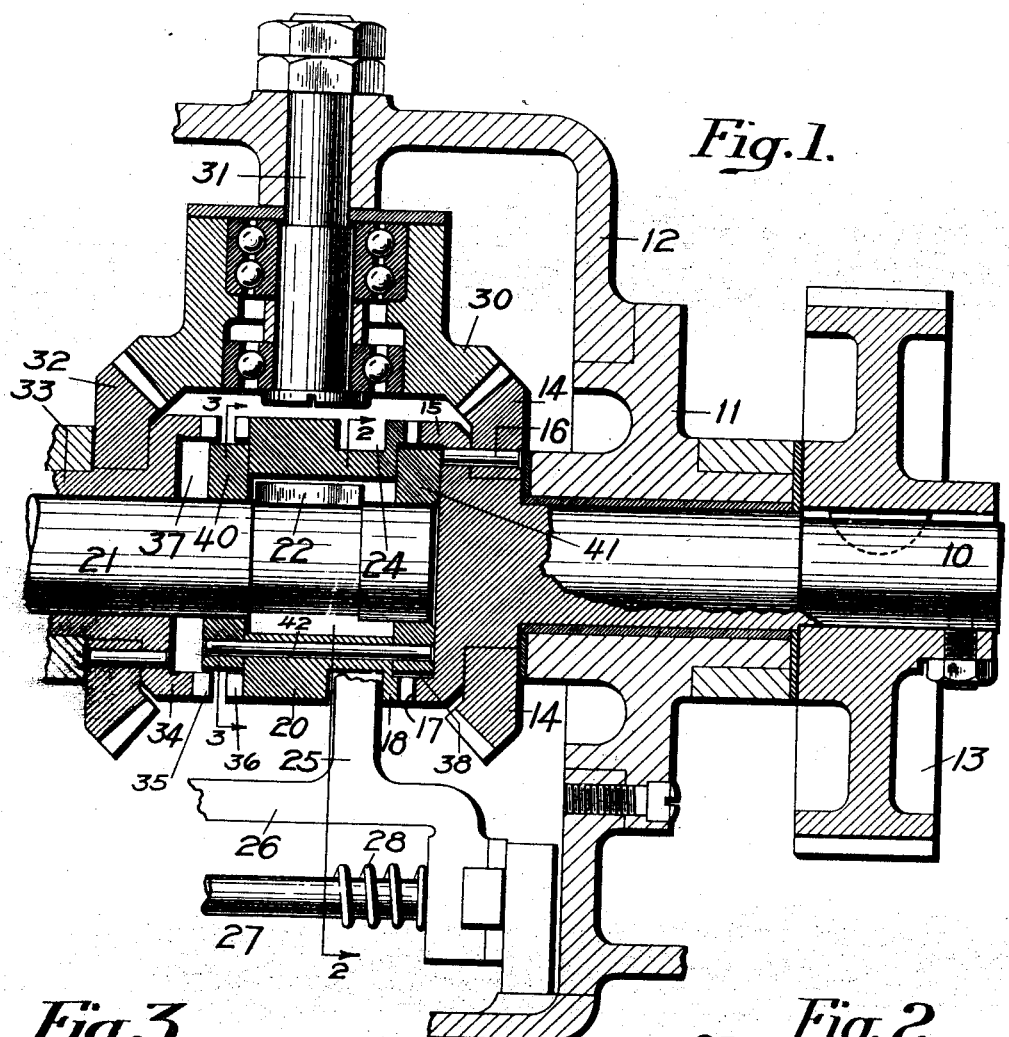
Figure 1 is a horizontal sectional view of my improved reversing mechanism.

In the practice of my invention I provide a novel driving and reversing mechanism comprising a sliding clutch member movable on a shaft between rotatable gears which are oppositely driven by suitable power mechanism. To overcome the shock incident to the engagement of clutch teeth, I provide oil cushioning and sound deadening means which retard the movement of the clutch member when it is substantially at the end of its path. Since the parts moved by the driven shaft have considerable momentum, I fasten the sliding clutch member to the shaft by means which permit the shaft to continue rotation after the clutch has been thrown and the sliding member has started to rotate in the opposite direction.

Referring to the drawings, which illustrate one embodiment of my invention, I have there shown a driving shaft 10 rotatable in a bearing 11 in a frame or casing 12 which supports the reversing mechanism. The shaft 10 may be driven in any convenient manner, as by a spur gear 13, and is enlarged at its inner end to provide a seat for a bevel gear 14. The shaft 10 is also provided with an annular flange 15 to which the bevel gear 14 may be secured by pins or rivets 16. Upon its inner face the flange 15 is provided with teeth 17 for engagement with corresponding teeth 18 on the sliding clutch member 20.

The member 20 is slidable upon a driven shaft 21 which is provided with a lug or projection 22 (Fig. 2) adapted to engage a corresponding lug 23 formed on the inside of the sliding member 20, the functions of which parts will be more fully explained hereinafter. A groove 24 is formed in the outer surface of the member 20 to receive a yoke member 25 on a casting 26 which is slidable upon a fixed shaft 27. In order that the clutch member 20 may be quickly moved from one coöperating set of clutch teeth to the other without liability of the machine coming to rest with the clutch in neutral position, it is usual to provide means for shifting the clutch through a direct agency other than the movement of the table. One means for accomplishing this may involve springs in which energy is stored by the movement of the table until such time as it may be released to shift the position of the clutch instantaneously. A device which may be employed for this purpose is illustrated and described in a United States Patent Number 762,838, granted to me on June 14, 1904. In this construction, springs 28 are provided for forcing the casting 26 longitudinally, and latches, not shown, hold the casting in position while the springs 28 are being compressed. Upon the lifting of the retaining latch, the casting 26 is abruptly thrown to the opposite end of its path of travel, carrying with it the yoke 25 and the sliding clutch member 20.

A bevel gear 30 mounted on ball bearings supported by a fixed stud 31 is engaged by the bevel gear 14 and drives a similar bevel gear 32 secured to a sleeve member 33 loosely rotatable upon the driven shaft 21. The member 33 is provided with a flange portion 34 having teeth 35 coöperating with teeth 36 upon one end of the sliding clutch member.

Figure 3:
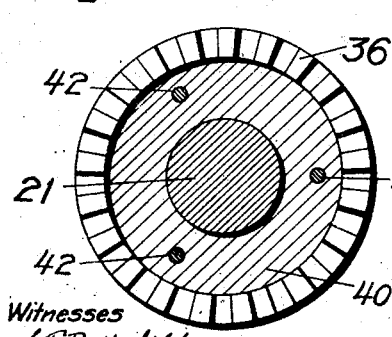
Fig. 3 is a sectional view of a portion of the sliding clutch member taken along the line 3—3—Fig. 1.

In order to provide an oil cushion for the sliding clutch mechanism, I form cylindrical recesses 37 and 38 in the inner ends of clutch members 33 and 15 surrounding the shaft 21. Cylindrical plungers 40 and 41 adapted to enter these recesses are provided on the opposite ends of the sliding clutch member 20, each being similar in shape with but slightly smaller in diameter than the adjacent recess so as to provide an annular passage between the plunger and recess wall. It will be observed from an inspection of Figs. 1 and 2, that the lug 23 on the interior of the sliding clutch member 20 extends for such a short distance, measured peripherally, that the fit between the clutch member and the shaft 21 is wholly destroyed; hence I make the cylindrical plungers 40 and 41 serve the additional function of holding the clutch member concentric with the shaft. The whole mechanism is carried in a receptacle filled with a fluid such as oil, so that when the clutch member is thrown, the plunger 40, for example, is forced into the depression 37 against the oil cushion, the oil passing out gradually through the annular passage around the plunger and permitting the clutch member to reach the limit of its movement without material shock. The plunger and recess may be so shaped that the oil is forced out at a gradually decreasing rate as the plunger goes in, or the parts otherwise arranged to form a satisfactory cushion for the clutch member. The several parts of the sliding clutch member may be rigidly secured together by bolts or rivets 42 (Figs. 1 and 3).

The operation of the device is considered obvious. When a latch is released to reverse the drive, the springs 28 force the sliding clutch member 20 instantly toward the opposite end of its path of travel. Assuming that the parts are as in Fig. 1, the clutch member will be moved abruptly to the left, until the projection 40 enters the recess 37. The movement of the clutch member will then be reduced in speed as the oil in the recess 37 escapes around the edge of the loosely fitting plunger, whereby the member 20 is brought gradually to a state of rest with its teeth 36 in engagement with the driving teeth 35 of the member 33. When the clutch is moved in the reverse direction the plunger 41 enters the groove 38 and similarly eliminates the shock which would otherwise be had when the clutch teeth engage.

Figure 2:
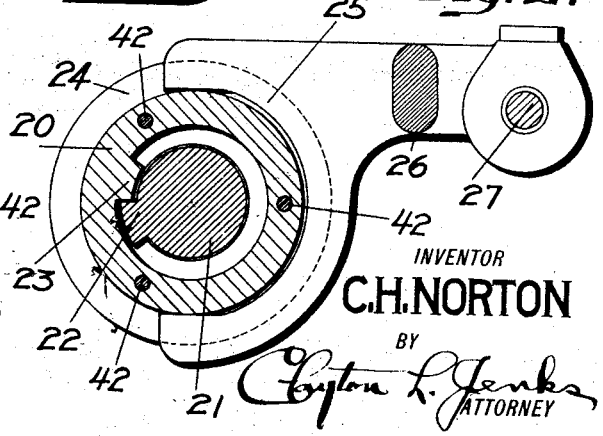
Fig. 2 is a vertical sectional view taken along the line 2—2—Fig. 1.

When the clutch is thrown, the driving lug 23 on the inside of the sliding clutch member rotates from the position shown in Fig. 2 to a position where it engages the opposite side of the lug 22, this movement allowing time for the shaft 21, and the load driven thereby, to come gradually to rest before it must be moved in the opposite direction. The lug 22 accordingly serves as a key mounted in a wide groove in the outer slidable member 20, the groove being wider than the key to provide for lost motion upon reversal of motion of the parts. As illustrated, this groove extends nearly around the member 21, leaving only a projection or lug 23 on the outer member 20. However, the size of these relative lugs may be proportioned in accordance with the time necessary to allow the movable driven parts to come to rest under their own frictional retardation.

This construction serves to divide the shock of starting the mechanism into two separate lesser shocks, this being due to the fact that when the mechanism is reversed the machine must first start the rotatable clutch member and then, when lug 23 contacts with lug 22, start the shaft 21. Also, the lost motion in the keyway permits the shaft 21 to continue to rotate in its original direction under the inertia of the load until it gradually comes to a stop after the clutch member has been thrown for a reverse motion and the lug 23 has started in the other direction, the net result being that the lug 22 on the shaft 21 and the lug 23 on the member 20 advance from opposite directions to meet each other.

While I have shown the recesses formed in the driving members and the projections on the clutch members the reversal of these parts will be obvious, and this construction is considered to be within the scope of my invention. Other changes and modifications will be evident to those skilled in the art, and I do not wish to be limited to the details herein disclosed other than as set forth in the appended claims.

This application is a continuation of my copending case, Serial #127,397 filed October 24, 1916 on a Reversing Mechanism.

Having thus described my invention, what I claim as new and useful and desire to secure by Letters Patent is:—

1. A reversing mechanism having in combination a shaft, a driven member slidably mounted on said shaft, means for rotating said member in either direction, and a lost motion connection between said member and shaft whereby said member may be moved freely through a substantial angle relative to said shaft upon reversal of said member before positive engagement with said shaft.

2. A reversing mechanism having in combination a shaft, a driven member slidably mounted on said shaft, means for rotating said member in either direction, and a lost motion connection between said member and shaft comprising a lug on said member adapted to engage either side of a corresponding lug on said shaft and effective to drive said shaft thereby.

3. In a reversing mechanism for reciprocating a heavy body, rotative driving and driven members, means comprising a reversible clutch and a lost motion connection between said members for rotating the driven member and permitting it to come gradually to rest after the clutch has been reversed and means to cushion movement of the clutch to reduce the shock of reversing the mechanism.

4. In a reversing mechanism, a driven shaft, a clutch, comprising oppositely rotatable driving parts and a member slidable therebetween for engaging one or the other of said parts to rotate the shaft in either direction, a lost motion connection between said clutch and the driven shaft permitting the shaft to continue rotation after the clutch has been shifted and means to cushion the sliding movement of the clutch member.

5. In a reversing mechanism for driving heavy bodies, a shaft, a driven clutch member slidably mounted on the shaft, means for rotating said member in either direction, a lost motion connection between said member and said shaft whereby the latter may continue its original motion after the direction of the clutch member has been changed and cushioning means to eliminate the shock incident to slidable movement of the clutch member.

6. In a reversing mechanism, a rotatable driven shaft, a clutch member slidably mounted on the shaft, means including clutch parts coöperating with said member to rotate the latter in opposite directions, a lost motion connection between said member and the shaft permitting the latter to continue its original motion after the clutch has been thrown and a plunger on an end of the clutch member, one of said clutch parts having a fluid-filled recess engageable by said plunger and adapted to cushion the movement of the clutch.

7. In a reversing mechanism for reciprocating a massive body, a driven shaft having a lug thereon, a clutch member slidably and rotatably mounted on the shaft and having a lug on its inner surface adapted to engage either side of the shaft lug, thereby constituting a lost motion connection between said member and shaft, rotatable driving parts adjacent the ends of and engageable by said member to rotate the latter and a plunger on each end of the clutch member, each of said parts having a fluid-filled recess engageable by the adjacent plunger and adapted to cushion the movement of the clutch member as the clutch is shifted.

8. A reversing mechanism having in combination, a driven shaft, two driving members rotatable in opposite directions, a clutch member loosely surrounding and slidable on the shaft into operative relation with either of the driving members, a lost motion driving connection between the clutch member and the shaft and means for positioning the clutch member concentrically of the shaft.

9. A reversing mechanism having in combination a driven shaft, two driving members rotatable in opposite directions having recesses in their inner faces, a clutch member slidable on the shaft into operative relation with either of the driving members and provided with an internally projecting lug, a coöperating lug on the shaft and plungers carried by the clutch member to position said member concentrically on the shaft and coöperate with the recesses to cushion the movement of the slidable clutch member.

Signed at Worcester, Massachusetts, this 21 day of March, 1918.

CHARLES H. NORTON.